July 17, 1962  P. J. F. OUDRY  3,044,320
COMBINED GEARBOX AND STEERING BOX FOR TRACKED VEHICLES
Filed May 13, 1959
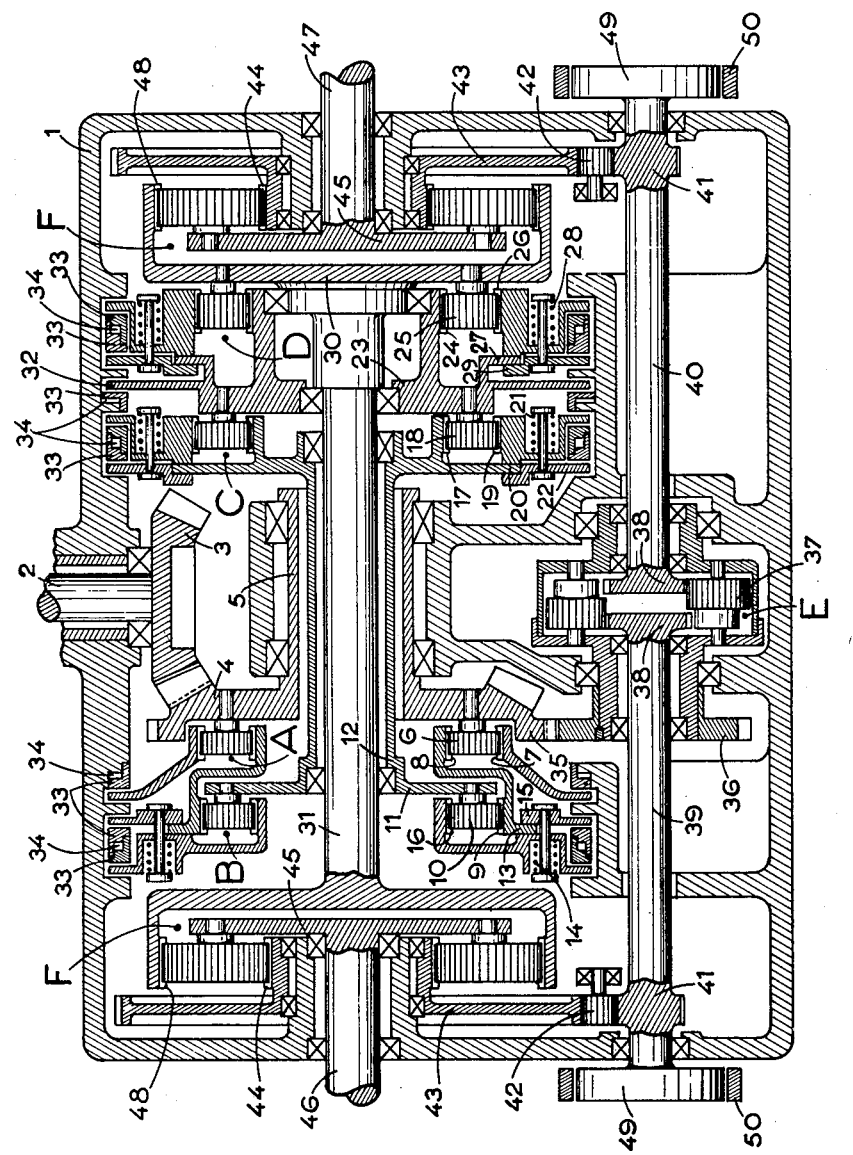

United States Patent Office 3,044,320
Patented July 17, 1962

3,044,320
COMBINED GEARBOX AND STEERING BOX FOR TRACKED VEHICLES
Paul Jean François Oudry, Sarcelle, France, assignor to Batignolles-Chatillon (Mecanique Generale), Paris, France, a French company
Filed May 13, 1959, Ser. No. 812,947
3 Claims. (Cl. 74—710.5)

The present invention relates to a combined gearbox and steering box for tracked vehicles.

Known combined gearboxes and steering boxes for such vehicles are of the type in which the primary shaft and the two output shafts are arranged in co-axial fashion, the primary shaft, driven directly by way of a pair of bevel gears, being connected to the secondary shaft which drives the output shafts by way of a plurality of planetary reduction trains, arranged in series, and each selectively brought into operation by means of a brake which locks the annulus gear and a device which makes fast the annulus gear and the sun-wheel.

The object of the present invention is to embody a box of the aforementioned type, so arranged as to produce a particularly compact whole which is symmetrical with respect to the plane passing through the driving shaft; another object of the invention is to obtain a neutral position in the box itself, in spite of the use of planetary trains for change-speed purposes, so that the usual clutch may be eliminated; finally a third object is to provide a speed-reduction at the input to the box, so that bearing loads and speeds inside the box are limited.

According to the invention, the satellite-carrier of the first planetary reduction train forms the member which drives the following reduction train, the annulus gear being fast with the sun-wheel of a planetary step-up train whereof the satellite-carrier is rotationally driven by the primary shaft, and whereof the annulus gear is equipped with a locking brake, releasing this brake having the effect of breaking the connection between the primary shaft and the secondary shaft (neutral position of the box).

A particular method of embodiment of a combined gearbox and steering box according to the invention is illustrated in more or less diagrammatic fashion in the appended drawing, and is described hereinafter.

The single FIGURE of the drawing is a section on the plane common to the driving shaft and the two output shafts of the box.

As shown in the drawing, the whole of the change-speed mechanism is disposed in a container 1; the driving shaft 2 drives the primary shaft 5 of the gearbox by way of a pair of bevel reduction gears 3, 4. This shaft forms the satellite-carrier of a planetary step-up train A; the satellites 6 mesh with an annulus gear 7 and a sun-wheel 8 fast with the annulus gear 9 of a planetary reduction train B, whereof the satellites 10 are mounted on a satellite-carrier 11 fast with one end of a hollow shaft 12.

The annulus gear 9 is equipped with a rim 13 which is gripped between a ring 15 and the sun-wheel 16, under the action of a spring 14. At its other end, the hollow shaft 12 carries the sun-wheel 17 of a planetary reduction train C, comprising the satellites 18 and an annulus gear 19. The hollow shaft 12 is equipped with a plate 20 which is gripped between the annulus gear 19 and a ring 22, under the action of a spring 21.

The satellite-carrier 23 of the planetary train C is fast with the sun-wheel 24 of a planetary reduction train D, comprising the satellites 25 and an annulus gear 26. The satellite-carrier 23 is equipped with a rim 27 which is gripped between the annulus gear 26 and a ring 29, under the action of a spring 28. The satellite-carrier 30 of the planetary train D is formed by a plate fitted at one end of a shaft 31, which forms the secondary shaft of the gearbox.

Braking devices, disposed on the container 1 concentrically with the hollow shaft 12, are respectively intended to lock the annulus gear 7 of the planetary train A, the ring 15 and the sun-wheel 16 of the planetary train B, the annulus gear 19 and the ring 22 of the planetary train C, the annulus gear 26 and the ring 29 of the planetary train D and a plate 32 fast with the satellite-carrier 23 of the planetary train C.

The braking devices consist of braking discs 33 which are axially displaced under the action of a liquid under pressure admitted to the chambers 34; in the planetary trains B, C and D, displacement of the braking discs moreover has the effect of axially displacing the braked members, which, by moving away from one another, release the rims 13 and 27 in the planetary trains B and D, and the plate 20 in the planetary train C.

Such braking devices, applied to planetary trains, formed the subject of French Patent No. 1,134,822 of the 12 July, 1953.

The primary shaft 5 is fast with a toothed annulus gear 35 which meshes with a pinion 36 fast with the satellite-carrier of a differential E, comprising spur pinions, whereof the satellites 37 mesh on the one hand with one another, and on the other hand with one or other of the two planetary pinions 38, each mounted on one of the output shafts 39 and 40 of the differential.

The shafts 39 and 40 are each equipped with a pinion 41 which drives, by way of a pinion 42, a toothed wheel 43 fast with the sun-wheel 44 of a planetary differential F, whereof the satellite-carrier 45 is fast with one of the output shafts 46 and 47 of the gearbox, the annulus gear 48 being fast with one of the two plates mounted at the ends of the secondary shaft 31.

To each of the two shafts 39 and 40 is fitted a brake-drum 49, upon which the brake-shoes 50, for example hydraulically operated, can act.

In the neutral position illustrated, none of the locking brakes which act on the planetary trains is applied. The sun-wheels and annuli gears of each of the planetary trains B, C and D are made fast with one another by the action of the springs 14, 21 and 28, and these planetary trains rotate as a unit; the annulus gear 7 of the planetary train A rotates freely.

For the various forward gears, the annulus gear of the planetary step-up train A is always locked by its brake.

First gear is obtained by locking the sun-wheel 16 of the planetary train B and the annuli gears 19 and 26 of the planetary trains C and D. The three trains B, C and D, whereof the annuli gears and the respective sun-wheels have been freed, give three consecutive reductions between the primary shaft 5 and the secondary shaft 31.

Second gear is obtained by locking the annuli gears 19 and 26 of the planetary trains C and D, the planetary train B rotating as a unit since its sun-wheel 16 and its annulus gear 9 are made fast with one another.

Third gear is obtained by locking the sun-wheel 16 of the planetary train B and the annulus gear 26 of the planetary train D; the planetary train C rotates as a unit.

Fourth gear is obtained by locking the annulus gear 26 of the planetary train D, the planetary trains B and C rotating as a unit.

Fifth gear is obtained by locking the sun-wheel of the planetary train B, the planetary trains C and D rotating as a unit.

Finally, for sixth gear, only the annulus gear 7 of the planetary train A remains locked, the three planetary trains B, C and D rotating as a unit.

For reverse gear, the annulus gear 26 of the planetary train D and the plate 32 fast with the sun-wheel 24 are locked, while the annulus gear 7 of the planetary train A is released. The whole planetary system A, B, C, D is thus locked, as is the secondary shaft 31, and reverse motion is transmitted to the output shafts 46 and 47 by the differential E, which is driven by way of the toothed wheels 35 and 36, and the two differentials F.

For cornering purposes, braking the shaft 39 or 40 on the opposite side to that towards which the corner is to be taken has the effect of locking or retarding the sun-wheel of the corresponding differential F, the sun-wheel of the opposite differential F being driven at higher speed by the action of the differential E. In the limiting case of cornering when stationary, the two output shafts 46 and 47 rotate in opposite directions to one another.

The gearbox which has just been described therefore enables a neutral position to be obtained without any clutching and declutching members and operations; it is sufficient to lock the annulus gear of the planetary train A for the whole range of forward gears, and to release this annulus gear to give neutral, reverse gear and cornering when stationary if required.

Moreover, the presence of the planetary step-up train A enables a speed equal or substantially equal to that of the engine shaft to be introduced into the chain comprising the planetary reduction trains B, C and D, in spite of the reduction between the driving shaft and the primary shaft of the gearbox.

The gearbox which has just been described could naturally be modified in detail, or supplemented by any useful accessory, without departing from the scope of the invention for that reason.

Thus, in particular, the presence of three planetary reduction trains would enable eight gears to be provided instead of six if the planetary trains B and C, for example, were given different reduction ratios.

What I claim is:

1. A combined gearbox and steering box for tracked vehicles comprising a drive shaft, a primary shaft, a pair of bevel gears drive connecting said shafts, a secondary shaft, a plurality of planetary reduction gears each having an annulus gear, a sun-wheel, and a planet carrier drivingly connected to said annulus gear and said sun-wheel, said reduction gears being coupled in series between said primary shaft and said secondary shaft, two output shafts drive connected to said secondary shaft, said output shafts being coaxial with said primary shaft, selectively operable braking means for each annulus gear of said planetary reduction gears, selectively operable means coupling the annulus gear and sun-wheel of each of said planetary reduction gears and locking the first of said plurality of said planetary reduction gears to said secondary shaft, each of said planet carriers constituting drive means for the succeeding one of said reduction gears, a planetary step-up gear drivingly connected between said first planetary reduction gear and said primary shaft, an annulus gear and a sun-wheel for said step-up gear, a planet carrier for said step-up gear fixed on said primary shaft and brake means for said annulus gear of said step-up gear which in released condition disengages said primary shaft from said secondary shaft.

2. A combined gearbox and steering box as described in claim 1 in which the step-up ratio of said planetary step-up gear is equal to the reduction ratio of said pair of bevel gears.

3. A combined gearbox and steering box as described in claim 1 including a differential drive connected to said primary shaft, shafts driven by said differential, and brake means for said drive connection between said output shafts and said secondary shaft including a planetary differential gear, each of said driven shafts being drive connected by reduction gears to the sun-wheel of one of said planetary differential gears, a planet carrier for each of said last named planetary differential gears each of said planet carriers being secured to one of said output shafts and an annulus gear for said last named planetary differential gear secured to said secondary shaft.

References Cited in the file of this patent

UNITED STATES PATENTS

| | | |
|---|---|---|
| 2,377,354 | Merritt | June 5, 1945 |
| 2,689,488 | Storer et al. | Sept. 21, 1954 |
| 2,689,489 | Storer et al. | Sept. 21, 1954 |
| 2,757,513 | Banker | Aug. 7, 1956 |
| 2,930,257 | Christenson | Mar. 29, 1960 |

UNITED STATES PATENT OFFICE
CERTIFICATE OF CORRECTION

Patent No. 3,044,320 July 17, 1962

Paul Jean François Oudry

It is hereby certified that error appears in the above numbered patent requiring correction and that the said Letters Patent should read as corrected below.

Column 4, lines 22 to 33, claim 3 should appear as shown below instead of as in the patent:

> A combined gearbox and steering box as described in claim 1 including a differential drive connected to said primary shaft, shafts driven by said differential, and brake means for each of said driven shafts, said drive connection between said output shafts and said secondary shaft including a planetary differential gear, each of said driven shafts being drive connected by reduction gears to the sun-wheel of one of said planetary differential gears, a planet carrier for each of said last named planetary differential gears each of said planet carriers being secured to one of said output shafts and an annulus gear for said last named planetary differential gear secured to said secondary shaft.

Signed and sealed this 4th day of December 1962.

(SEAL)
Attest:

ERNEST W. SWIDER
Attesting Officer

DAVID L. LADD
Commissioner of Patents